United States Patent
Chang et al.

(10) Patent No.: US 8,661,281 B2
(45) Date of Patent: Feb. 25, 2014

(54) USB HUB AND POWER MANAGEMENT METHOD THEREOF

(75) Inventors: Chen-Chao Chang, Hsinchu (TW); Ling-Sheng Yang, Hsinchu (TW); Chih-Chiang Chang, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 183 days.

(21) Appl. No.: 13/043,428

(22) Filed: Mar. 8, 2011

(65) Prior Publication Data

US 2012/0144213 A1   Jun. 7, 2012

(30) Foreign Application Priority Data

Dec. 6, 2010   (TW) ............................... 99142307 A

(51) Int. Cl.
*G06F 1/32* (2006.01)

(52) U.S. Cl.
USPC ........................... 713/324; 713/300; 713/320

(58) Field of Classification Search
USPC ........................... 713/300, 320, 322, 323, 324
See application file for complete search history.

(56) References Cited

U.S. PATENT DOCUMENTS

| | | | |
|---|---|---|---|
| 6,085,982 A * | 7/2000 | Nakashima | 235/492 |
| 6,178,513 B1 | 1/2001 | Lee | |
| 6,345,364 B1 | 2/2002 | Lee | |
| 6,541,879 B1 | 4/2003 | Wright | |
| 6,704,824 B1 * | 3/2004 | Goodman | 710/300 |
| 6,971,035 B2 * | 11/2005 | Kubota | 713/320 |
| 2005/0080973 A1 * | 4/2005 | Lee | 710/311 |
| 2007/0008663 A1 * | 1/2007 | Nakashima et al. | 361/18 |
| 2009/0164810 A1 * | 6/2009 | Kyro et al. | 713/310 |

FOREIGN PATENT DOCUMENTS

| | | |
|---|---|---|
| TW | 200428216 | 12/2004 |
| TW | I238320 | 8/2005 |
| TW | I240171 | 9/2005 |
| TW | 200606652 | 2/2006 |
| TW | 200641678 | 12/2006 |

OTHER PUBLICATIONS

Taiwan Patent Office, Office Action, Patent Application Serial No. 99142307, Sep. 27, 2013, Taiwan.

* cited by examiner

*Primary Examiner* — Paul Yanchus, III

(57) ABSTRACT

A USB HUB is provided. The USB HUB comprises a wireless communication module, a storage module, a USB interface connected to a host outside of the USB HUB and a HUB controller. The storage module stores a driver program of the wireless communication module. The USB interface transfers data with the host. The HUB controller is coupled to the USB interface, the wireless communication module and the storage module. The HUB controller disables the storage module and enables the wireless communication module when the driver program has been installed in the host.

13 Claims, 2 Drawing Sheets

USB HUB AND POWER MANAGEMENT METHOD THEREOF

CROSS REFERENCE TO RELATED APPLICATIONS

This Application claims priority of Taiwan Patent Application No. 099142307, filed on Dec. 6, 2010, the entirety of which is incorporated by reference herein.

BACKGROUND OF THE INVENTION

1. Field of the Invention

The present invention is related to a universal serial bus (USB) HUB and a power management method thereof, and more particularly to a USB HUB with wireless communications and a power management method thereof.

2. Description of the Related Art

A Universal Serial Bus (USB) is a serial bus standard to establish communications between a host and external devices, which supports hot plug and plug-and-play functions. A USB HUB is a device that expands a single USB port into several ports so that there are more ports available to connect various devices to a host system (e.g. PC).

According to USB specification, a maximum current that the host can provide to each USB port is up to 500 mA. However, if the device or module coupled to a USB HUB needs a larger current to keep normal operations, it is possible that current overload will occur. Large power consumption may cause unstable operation in the host system, causing the host system to crash.

BRIEF SUMMARY OF THE INVENTION

A USB HUB and a power management method thereof are provided. An embodiment of a USB HUB is provided. The USB HUB comprises a wireless communication module, a storage module, a USB interface connected to a host outside of the USB HUB and a HUB controller. The storage module stores a driver program of the wireless communication module. The USB interface transfers data with the host. The HUB controller is coupled to the USB interface, the wireless communication module and the storage module. The HUB controller disables the storage module and enables the wireless communication module when the driver program has been installed in the host.

Furthermore, an embodiment of a power management method for a universal serial bus (USB) HUB connected to a host is provided. The USB HUB comprises a function module and a storage module and the storage module is enabled. It is determined whether a driver program of the function module has been installed in the host. The storage module is disabled and the function module is enabled when the driver program of the function module has been installed in the host.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
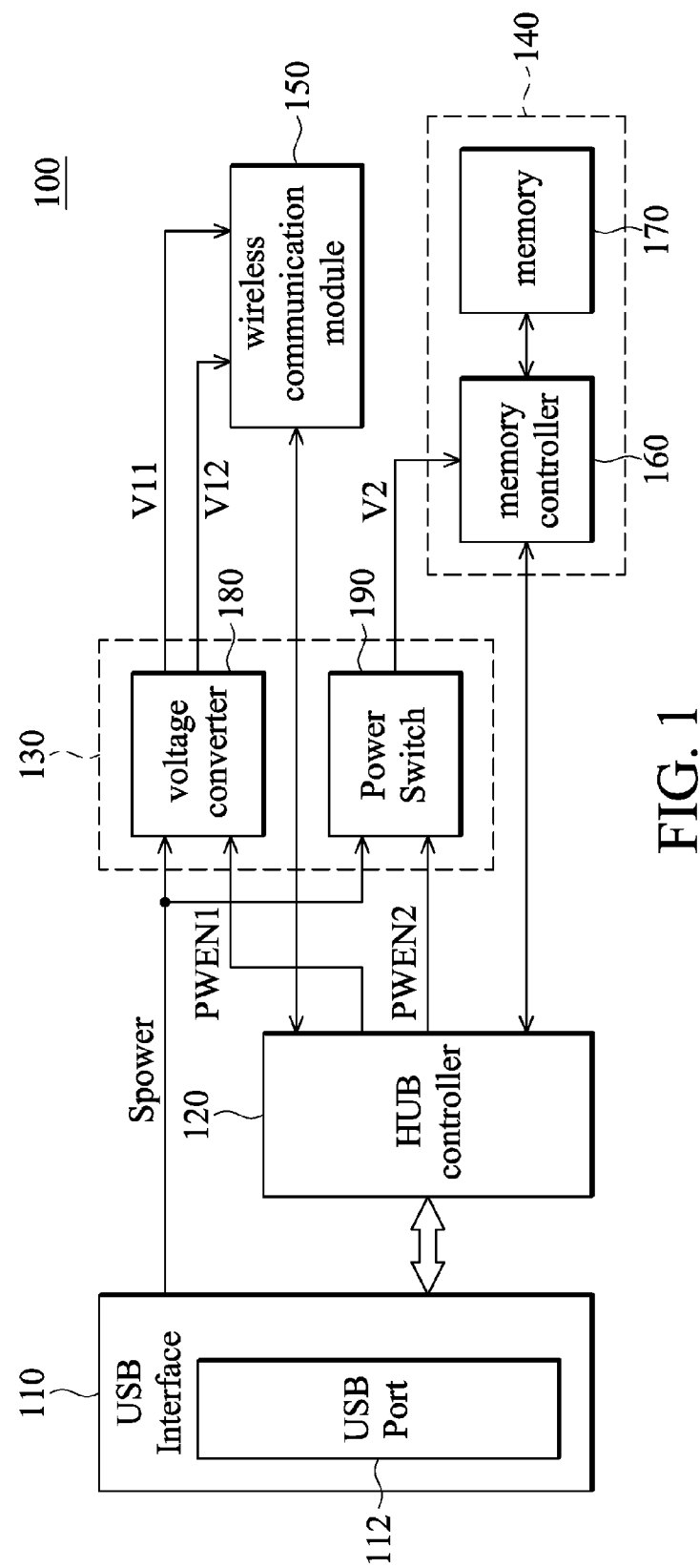
FIG. 1 shows a USB HUB according to an embodiment of the invention.

FIG. 1 shows a USB HUB 100 according to an embodiment of the invention. The USB HUB 100 comprises a USB interface 110, a HUB controller 120, a power module 130, a storage module 140 and a wireless communication module 150. The USB interface 110 connects to a host system (e.g. a PC) through a USB port 112. The HUB controller 120 is coupled to the USB interface 110, and the HUB controller 120 controls data communications between the USB interface 110 and the host system. The storage module 140 comprises a memory controller 160 and a memory 170. In the embodiment, the memory 170 is a flash memory, and the HUB control 120 controls the memory controller 160 to access the memory 170. The wireless communication module 150 may be a mobile communications module (such as 3G, 3.5G, 3GPP long term evolution (LTE)) or a wireless local area network (WLAN) module that needs a large operating current in normal operations. It is to be noted that a driver program of the wireless communication module 150 is stored in the memory 170 of the storage module 140.

In FIG. 1, the host system provides a power signal Spower (about 5V) to the power module 130 through the USB interface 110 when the USB HUB 100 is connected to the host system. The power module 130 comprises a voltage converter 180 and a power switch 190. In the embodiment, the voltage converter 180 may be a DC to DC (DC/DC) converter, which generates the operating voltages V11 and V12 according to the power signal Spower from the USB interface 110 and an enable signal PWEN1 from the HUB controller 120, so as to supply power to the wireless communication module 150. The operating voltages V11 and V12 have different voltage levels, such as 3.3V and 1.2V, for radio frequency (RF) circuits and baseband circuits within the wireless communication module 150. The power switch 190 generates an operating voltage V2 according to the power signal Spower and an enable signal PWEN2 from the HUB controller 120, so as to supply power to the storage module 140. In the embodiment, the power switch 190 is a transistor that functions as a switch, thus simplifying design and decreasing cost of the power module 130.

In the embodiments of the invention, the host system identifies the USB HUB 100 when the USB HUB 100 is connected to the host system for the first time. At this time, the host system supplies power to the USB HUB 100, and the HUB controller 120 controls the power module 130 to supply power to the storage module 140. Thus, the memory 170 of the storage module 140 is identified by the host system. Next, the HUB controller 120 transmits the driver program of the wireless communication module 150 stored in the memory 170 to the host system, so as to install the driver program in the host system. At this time, the host system only supplies power to the HUB controller 120 and the storage module 140 within the USB HUB 110 through the USB port 112, thereby no large current is consumed (e.g. 210 mA). Next, after the driver program of the wireless communication module 150 is installed completely, the HUB controller 120 controls the power module 130 to supply power to the wireless communication module 150 and to stop supplying power to the storage module 140, thus the host system may start to use the wireless communication module 150 for wireless communications. At this time, the host system only provides power to the HUB controller 120 and the wireless communication module 150 within the USB HUB 100 through the USB port 112, thus avoiding current overload caused by simultaneously providing the power supply to all modules of the USB HUB. Specifically, the host system does not supply power to the wireless communication module 150 and the storage module 140 at the same time.

Furthermore, when the USB HUB 100 connects to the host system again, the host system only supplies power to the HUB controller 112 and the storage module 140 within the USB HUB 100 through the USB port 112. However, once the host system identifies that the driver program of the wireless communication module 150 has been installed, the HUB controller 120 controls the power module 130 to supply power to the wireless communication module 150 and to stop supplying power to the storage module 140, such that the host system only supplies power to the HUB controller 120 and the wireless communication module 150 within the USB HUB 100, thereby avoiding the case wherein current flowing through the USB port 112 exceeds 500 mA.

Figure 2:
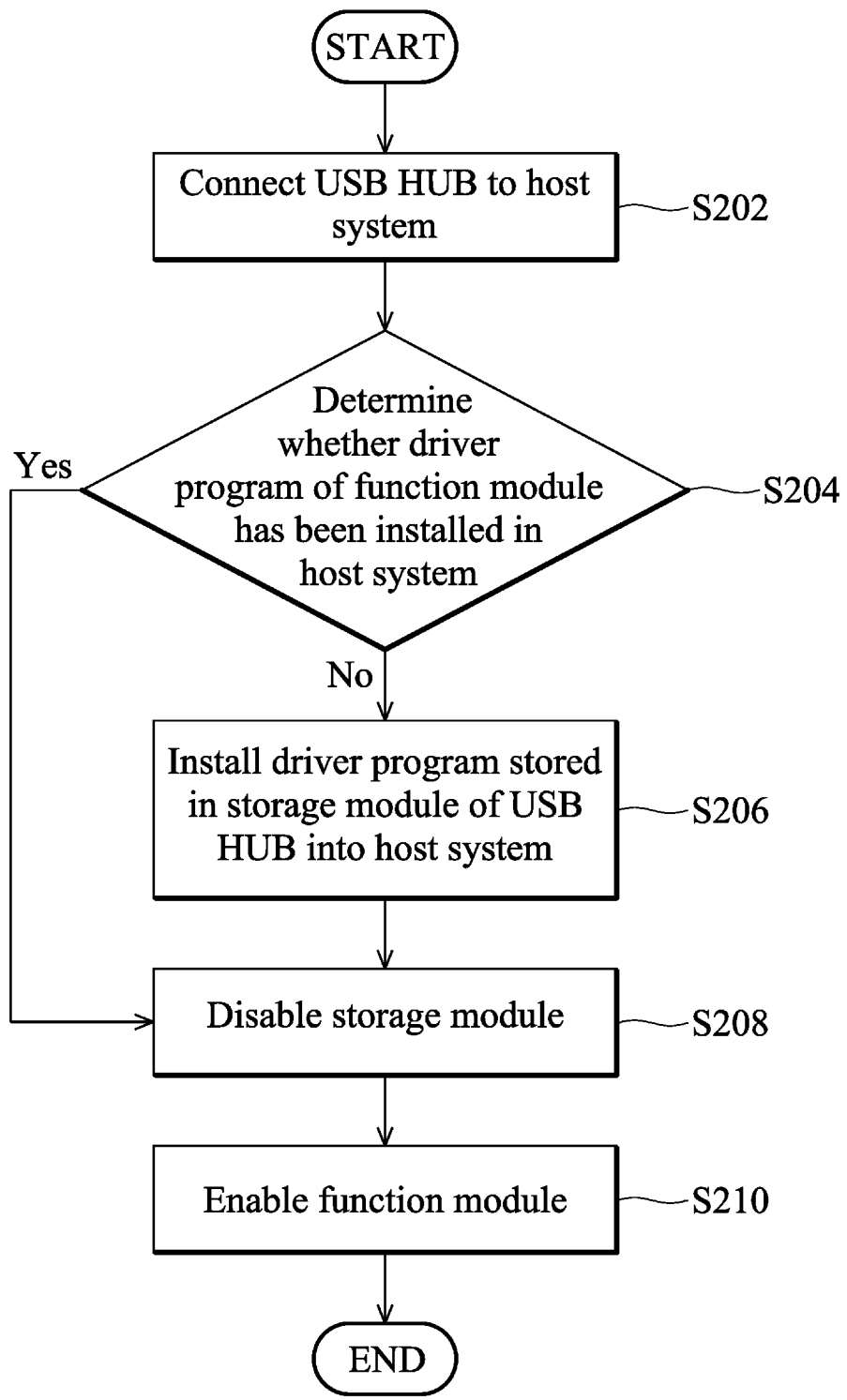
FIG. 2 shows a power management method for a USB HUB having at least one function module according to an embodiment of the invention.

FIG. 2 shows a power management method for a USB HUB (e.g. HUB 100 of FIG. 1) having at least one function module according to an embodiment of the invention. First, the USB HUB is connected to a host system (step S202). At this time, power supply of a storage module within the USB HUB is provided. Next, the host system identifies the connected USB HUB, to determine whether a driver program of the function module has been installed in the host system (step S204). If the driver program of the function module has not been installed in the host system, the host system executes an installation procedure according to the driver program of the function module stored in the storage module of the USB HUB (step S206). Next, the USB HUB stops supplying power to the storage module after the installation of driver program is completed, so as to disable the storage module (step S208). Next, the USB HUB supplies power to the function module after the storage module is disabled, so as to enable the function module (step S210). On the contrary, when it is determined that the driver program of the function module has been installed in the host system (step S204), the USB HUB stops supplying power to the storage module, so as to disable the storage module (step S208). Next, the USB HUB supplies power to the function module after the storage module is disabled, so as to enable the function module (step S210). In other words, the function module and the storage module are not enabled at the same time.

In the embodiments of the invention, current exceeding 500 mA is prevented from flowing through a USB port, as supply power to the modules of the USB HUB that are not being used is stopped, thus increasing current efficiency. Furthermore, PCB temperature of the USB HUB is decreased by disabling the modules that are not being used, thereby lifetime and stability of the components within the USB HUB are increased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A universal serial bus (USB) HUB, comprising:
   a wireless communication module;
   a storage module, storing a driver program of the wireless communication module;
   a USB interface connected to a host outside of the USB HUB, transferring data with the host;
   a HUB controller coupled to the USB interface, the wireless communication module and the storage module, wherein the HUB controller disables the storage module and enables the wireless communication module when the driver program has been installed in the host; and
   a power module coupled to the HUB controller, comprising:
      a voltage converter coupled to the wireless communication module, converting a power signal from the USB interface to generate a plurality of first powers having different voltage levels to the wireless communication module, wherein the different voltage levels are smaller than the power signal from the USB interface, respectively; and
      a power switch coupled to the storage module, generating a second power according to the power signal from the USB interface;
   wherein the HUB controller controls the power module not to supply the first powers to the wireless communication module and the second power to the storage module simultaneously.

2. The USB HUB as claimed in claim 1, wherein the HUB controller does not enable the storage module and the wireless communication module at the same time.

3. The USB HUB as claimed in claim 1, wherein the HUB controller transmits the driver program to the host when the driver program is not installed in the host, so as to install the driver program in the host.

4. The USB HUB as claimed in claim 1, wherein the HUB controller controls the power module to supply the first powers to the wireless communication module when the driver program has been installed in the host, so as to enable the wireless communication module.

5. The USB HUB as claimed in claim 1, wherein the HUB control controls the power module to continuously supply the second power to the storage module when the driver program is not installed in the host, so as to transmit the drive program from the storage module to the host through the USB interface.

6. The USB HUB as claimed in claim 1, wherein the storage module comprises:
   a memory, storing the driver program; and a memory controller, transmitting the driver program from the memory to the host for installation when the driver program is not installed in the host.

7. The USB HUB as claimed in claim 1, wherein the wireless communication module is a mobile communications module or a wireless local area network (WLAN) module.

8. A power management method for a universal serial bus (USB) HUB connected to a host, wherein the USB HUB comprises a function module and a storage module and the storage module is enabled, comprising:
   determining whether a driver program of the function module has been installed in the host; and
   disabling the storage module and enabling the function module when the driver program of the function module has been installed in the host,
   wherein the step of disabling the storage module and enabling the function module further comprises:
      stopping to supply a first power to the storage module, so as to disable the storage module; and supplying a plurality of second powers to the function module according to a power signal from the host, so as to enable the function module, wherein the USB HUB further comprises:

a voltage converter coupled to the function module, converting the power signal from the host to generate the second powers having different voltage levels, wherein the different voltage levels are smaller than the power signal from the host, respectively; and a power switch coupled to the storage module, generating the first power according to the power signal from the host, wherein the first power supplied to the storage module and the second powers supplied to the function module are not present simultaneously.

9. The power management method as claimed in claim 8, further comprising:

transmitting the driver program stored in the storage module to the host when the driver program is not installed in the host, so as to install the driver program in the host.

10. The power management method as claimed in claim 8, wherein the step of transmitting the driver program stored in the storage module to the host further comprises:

continuously supplying the first power to the storage module, so as to transmit the drive program from the storage module to the host.

11. The power management method as claimed in claim 8, wherein the storage module and the function module are not enabled at the same time.

12. The power management method as claimed in claim 8, wherein the storage module comprises:

a memory, storing the driver program; and a memory controller, transmitting the driver program from the memory to the host for installation when it is determined that the driver program is not installed in the host.

13. The power management method as claimed in claim 8, wherein the function module is a mobile communications module or a wireless local area network (WLAN) module.

* * * * *